(12) United States Patent
Kwak et al.

(10) Patent No.: US 6,280,875 B1
(45) Date of Patent: Aug. 28, 2001

(54) RECHARGEABLE BATTERY STRUCTURE WITH METAL SUBSTRATE

(75) Inventors: B. Leo Kwak, La Palma; Robert A. Clarke, Thousand Oaks; Richard F. David, Rancho Palos Verdes, all of CA (US)

(73) Assignee: Teledyne Technologies Incorporated, Los Angeles, CA (US)

( * ) Notice: Subject to any disclaimer, the term of this patent is extended or adjusted under 35 U.S.C. 154(b) by 0 days.

(21) Appl. No.: 09/275,466

(22) Filed: Mar. 24, 1999

(51) Int. Cl.[7] .............................. H01M 6/12; H01M 6/46
(52) U.S. Cl. ..................... 429/162; 429/127; 429/124; 429/247
(58) Field of Search ............................. 429/231.95, 162, 429/127, 124, 218.1, 246, 247

(56) References Cited

U.S. PATENT DOCUMENTS

| | | | |
|---|---|---|---|
| 5,512,147 | * | 4/1996 | Bates et al. ................ 204/192.15 |
| 5,569,520 | * | 10/1996 | Bates ............................... 429/162 |
| 5,705,293 | * | 1/1998 | Hobson ............................ 429/162 |

* cited by examiner

*Primary Examiner*—Gabrielle Brouillette
*Assistant Examiner*—Angela J. Martin
(74) *Attorney, Agent, or Firm*—Kirkpatrick & Lockhart LLP

(57) ABSTRACT

A thin-film rechargeable battery and its method of manufacture having a substrate over which may be formed layered battery components. The layered components include, in series, a first electrode layer, and an electrolyte layer. The layered arrangement reduces reactivity between the layered components and provides improved battery performance.

39 Claims, 14 Drawing Sheets

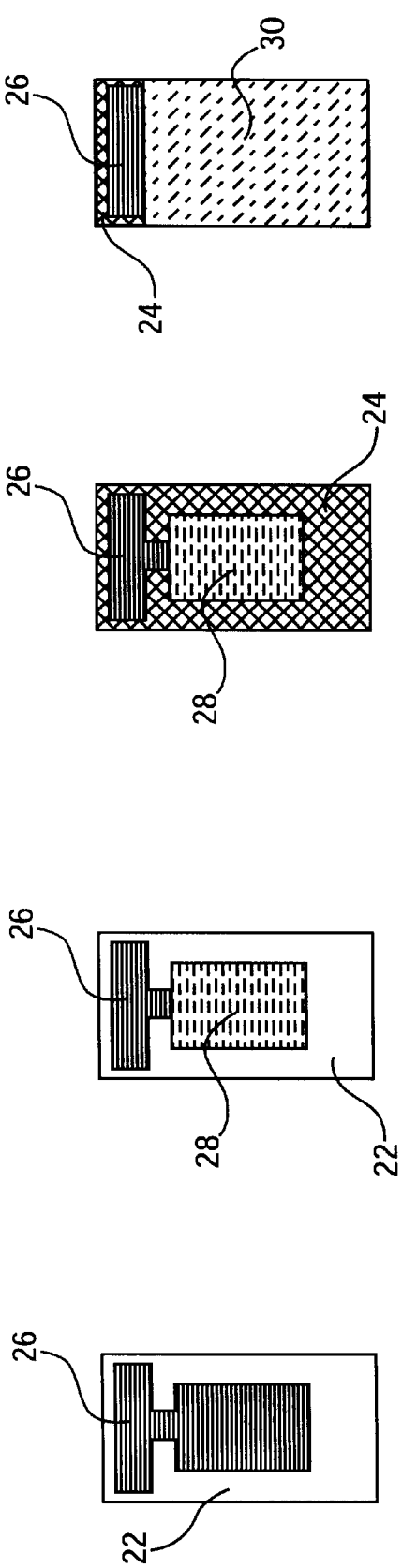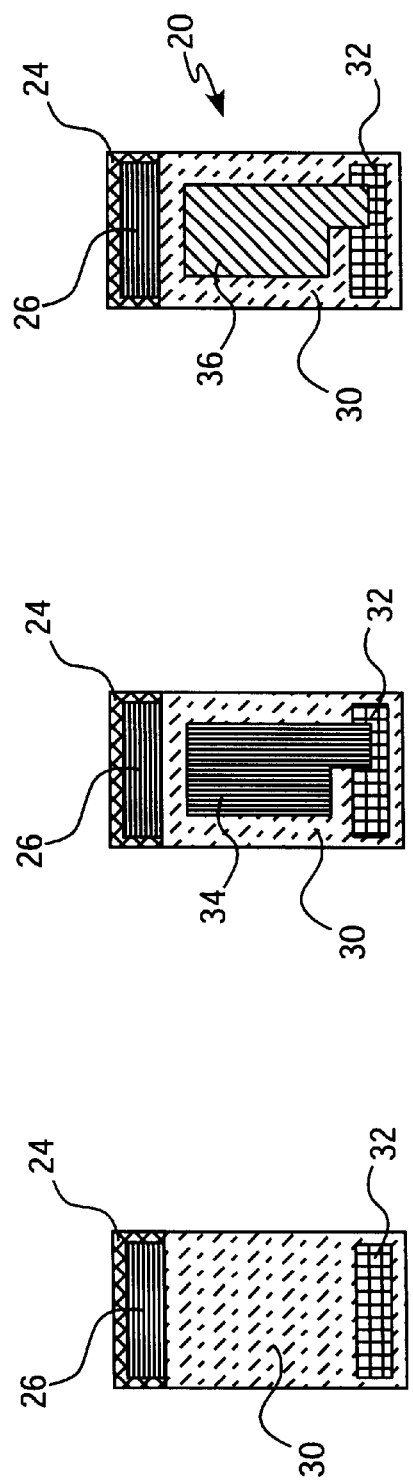

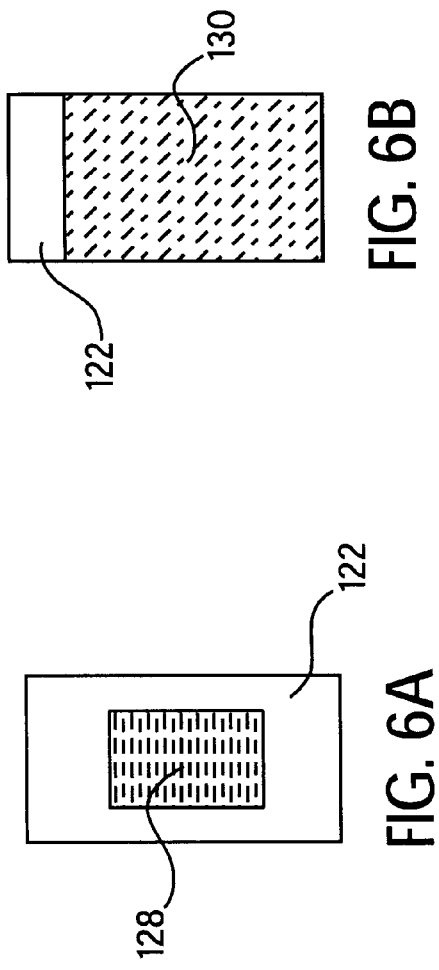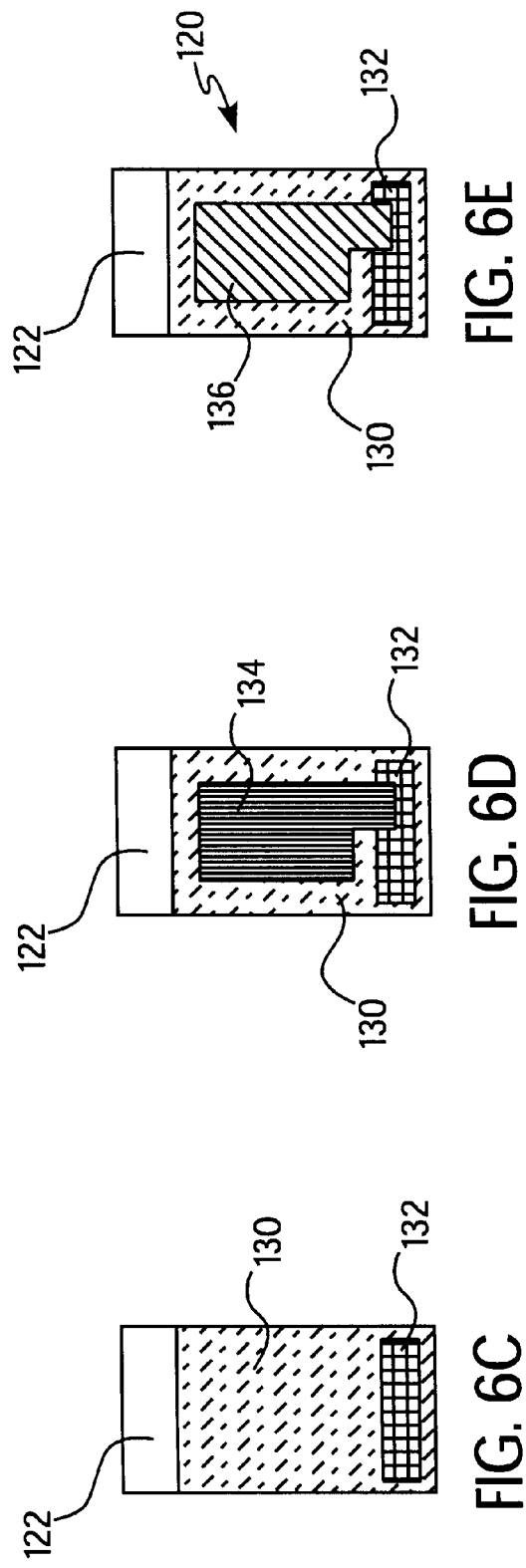

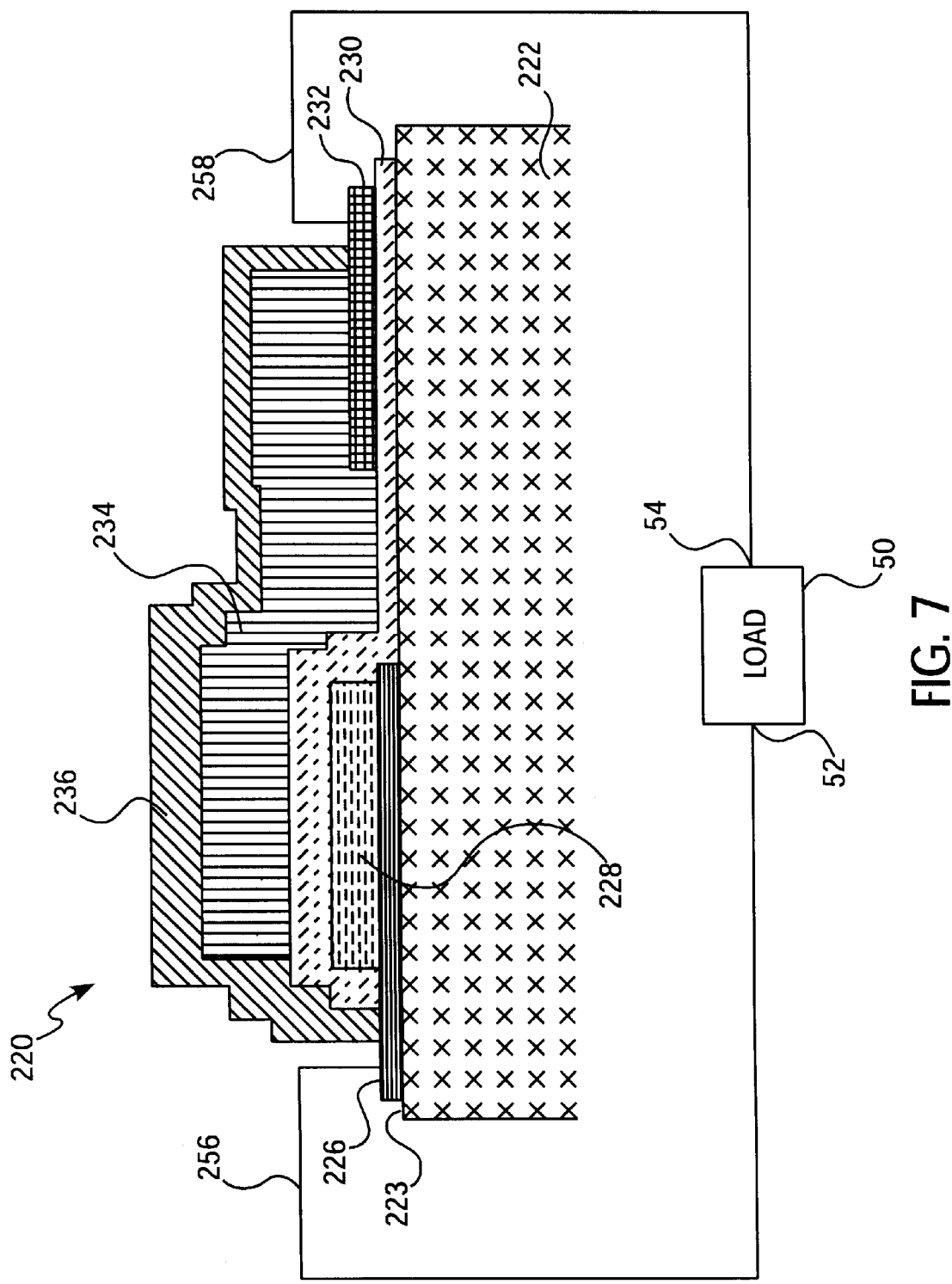

us 6,280,875 B1

RECHARGEABLE BATTERY STRUCTURE WITH METAL SUBSTRATE

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention is directed, generally, to a battery assembly, and more particularly, to a thin-film rechargeable battery and its method of manufacture.

2. Description of the Invention Background

A typical thin-film rechargeable battery incorporates a cathode current collector, a cathode, an anode current collector, an electrolyte, and an anode, in series, as layered components deposited over a substrate. The arrangement of the layered components and the materials that comprise each individual layer play an important role in determining the specific capacity, the utility, and performance of the battery cell.

The substrate may be selected from various materials, but is typically a glass, polymer, or ceramic. The choice of the substrate depends upon, among other factors, the processing conditions during manufacturing, such as, for example, temperature and reactive environment. For example, where the battery requires a low-power application suitable for amorphous cathodes, the substrate may be selected from a wide range of inexpensive materials including glass and polymers. On the other hand, ceramic substrates are typically used for high-power applications because high temperature annealing under oxidizing environments is required in order to obtain crystalline cathodes.

FIGS. 1 and 2A–2F illustrate a typical prior art thin-film rechargeable battery 10 and its method of manufacture. The layered components that form the battery 10 are deposited over a ceramic substrate 2 and include, in series, a cathode current collector 4, cathode layer 6, an anode current collector 8, an electrolyte layer 12, an anode layer 14, and a protective coating 16. For high-power applications, the manufacturing process includes an annealing step that follows the deposition of the cathode layer 6. Annealing the deposited cathode layer is necessary because, at ambient temperature, the cathode layer is typically amorphous and lacks the crystallinity and the conductance necessary for high-current requirements. It is the high temperature and other extreme processing conditions associated with the annealing step that typically limits the choice of substrate materials to ceramic, rather than glass or polymers, for high-power battery applications.

Although prior art battery designs are adequate for use with thin-film rechargeable batteries, several deficiencies exist in the prior art that limit their effectiveness. For example, formation of the layered components over the substrate is relatively time consuming as each of the six formed layers requires a separate manufacturing step. In addition, the arrangement of the layered components, in some cases, provides ineffective insulation between the active layers and inefficient battery utility and performance due to reactivity between the individual layers. Furthermore, for high-power applications, the fabrication method is, most often, limited to a "wafer-by-wafer" process because of the brittleness of the ceramic substrate. Because the thin ceramic materials are very fragile, there exists a lower limit in substrate thickness that must be employed to ensure sufficient durability. As a result, an intrinsic area-to-volume ratio limitation is created, which, in turn, results in specific capacity and energy limitations. Ceramic substrates are, also, relatively expensive and, therefore, comprise a significant portion of the overall manufacturing cost.

Accordingly, the need exists for an improved thin-film rechargeable battery and method of manufacture that, for example, may provide one or more of greater area-to-volume ratio for increased specific capacity and energy output, greater substrate strength for greater manufacturability, and increased manufacturing efficiency with diminished manufacturing cost.

BRIEF SUMMARY OF THE INVENTION

The present invention addresses the above-mentioned needs by providing variations of a thin-film rechargeable battery having a substrate which supports a new arrangement of layered components including, in series, a first electrode layer, and an electrolyte layer.

In one form, the battery of the present invention includes a metallic substrate to support layered components including, in series, a metal oxide layer, a first electrode current collector, a first electrode, an electrolyte layer, a second electrode current collector, and a second electrode layer. In this embodiment, the layered components are arranged to include a metal oxide layer overlaying at least a portion of the metallic substrate, a first electrode current collector overlaying at least a portion of the metal oxide layer, a first electrode layer overlaying at least a portion of the first electrode current collector, an electrolyte layer overlaying a portion of at least one of the metal oxide layer and the first electrode layer, a second electrode current collector overlaying at least a portion of the electrolyte layer, and a second electrode layer overlaying at least a portion of at least one of the electrolyte layer and the electrode current collector.

In another form, the battery of the present invention includes a metallic substrate that supports a first electrode layer overlaying at least a portion of the metallic substrate. An electrolyte layer overlays at least a portion of at least one of the metal substrate and the first electrode layer, an electrode current collector overlays the electrolyte layer, and a second electrode layer overlays at least one of the electrolyte layer and the electrode current collector.

The present invention also provides methods of forming layers of a thin-film rechargeable battery over a substrate and that includes forming, in series, a first electrode layer, an electrolyte layer, an electrode current collector, and second electrode layer. One such method includes forming a first electrode layer, forming an electrolyte layer over at least a portion of the first electrode layer, forming a first electrode current collector over at least a portion of the electrolyte layer, and forming a second electrode layer over at is least a portion of at least one of the electrolyte layer and the electrode current collector. For applications using a metallic substrate, one method provides that an electrode current collector is formed over the substrate as an underlying layer to the first electrode layer and in contact therewith. In another method, a metal oxide layer is formed as an underlying layer to the electrode current collector. Another method provides that an electrode current collector is formed over the substrate as an underlying layer to the first electrode layer and in contact therewith.

By using the layered component arrangement as herein described, the manufacturability, manufacturing efficiency, and utility of thin-film rechargeable batteries is significantly improved.

BRIEF DESCRIPTION OF THE SEVERAL VIEWS OF THE DRAWING

The characteristics and advantages of the present invention may be better understood by reference to the accompanying drawings, wherein like reference numerals designate like elements and in which:

FIGS. 4A–4G are top plan views illustrating one method of forming the thin-film rechargeable battery of FIG. 3;

FIGS. 6A–6E are top plan views illustrating one method of forming the thin-film is rechargeable battery of FIG. 5;

FIG. 7 is a cross-sectional view of another embodiment of the present invention illustrating the layered components over a substrate;

DETAILED DESCRIPTION OF THE INVENTION

Figure 1:
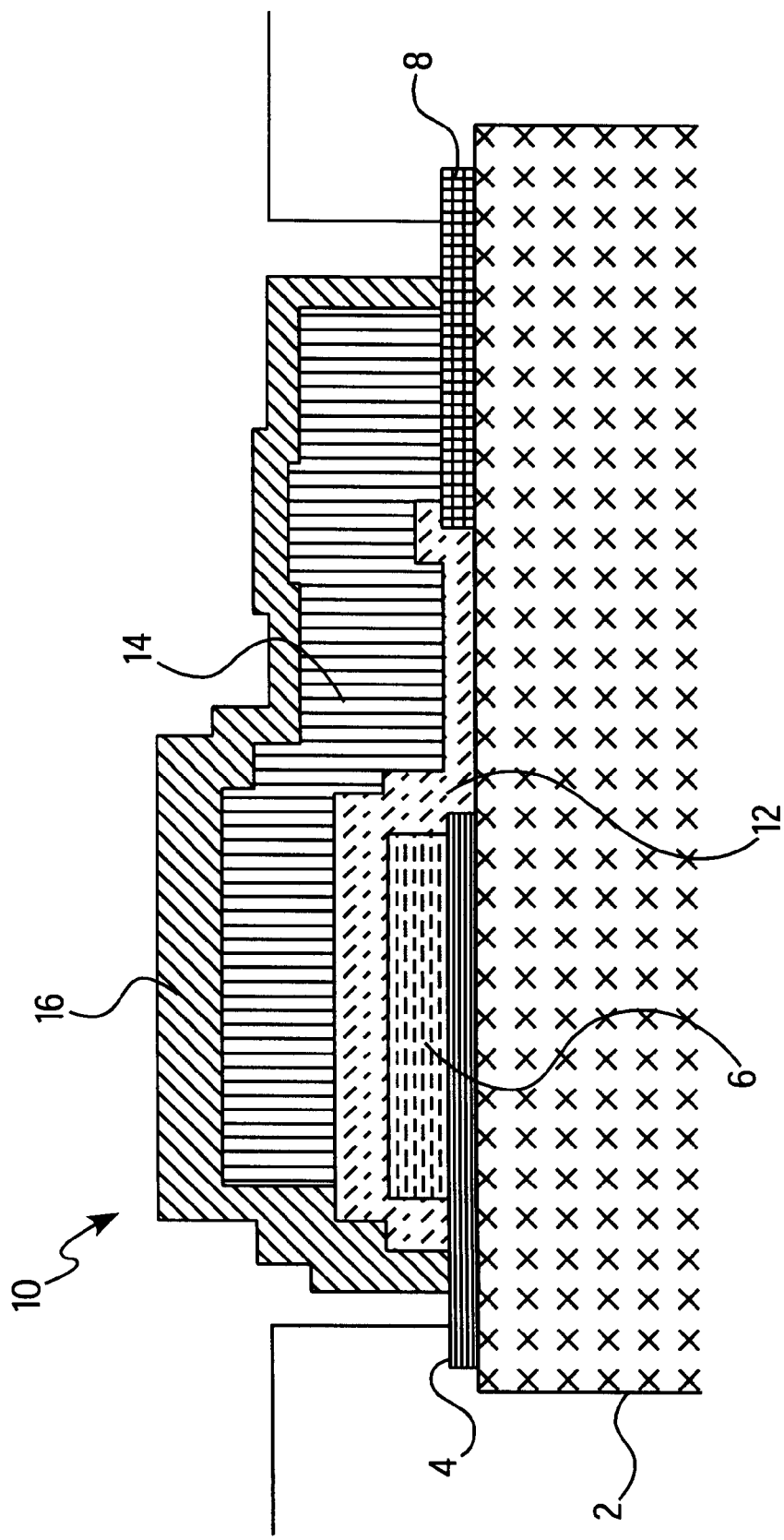
FIG. 1 is a cross-sectional view of a prior art thin-film rechargeable battery.
Figure 2A:
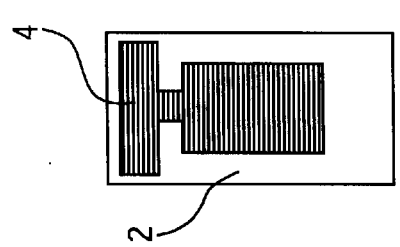
FIGS. 2A–2F are top plan views illustrating one prior art method of forming the thin film rechargeable battery of FIG. 1.
Figure 2B:
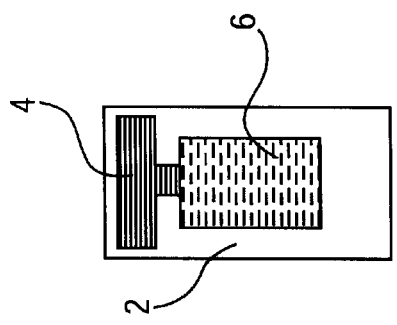
Figure 2C:
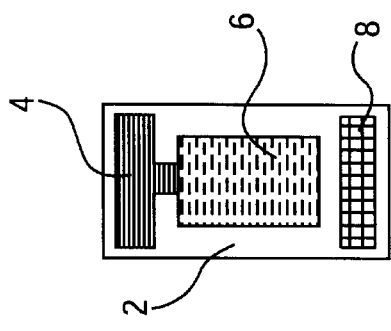
Figure 2D:
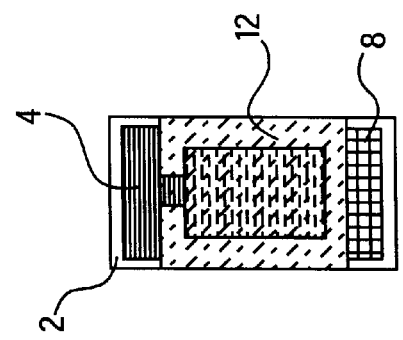
Figure 2E:
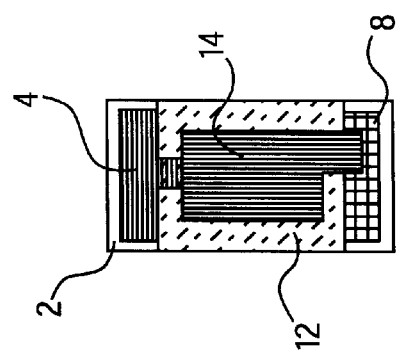
Figure 2F:
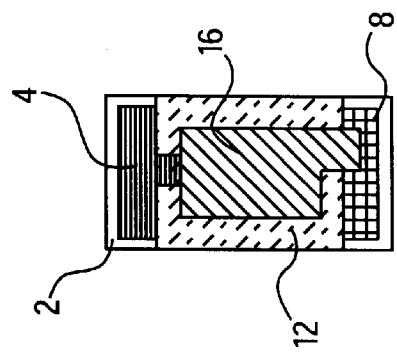

It is to be understood that the figures and descriptions of the present invention have been simplified to illustrate elements that are relevant for a clear understanding of the present invention, while eliminating, for purposes of clarity, other elements. Those of ordinary skill in the art will recognize that other elements may be desirable in order to implement the present invention. However, because such elements are well known in the art, and because they do not facilitate a better understanding of the present invention, a discussion of such elements is not provided herein.

In the present detailed description of the invention, the invention will be illustrated in the form of a thin-film rechargeable battery having particular parameters. To the extent that these parameters give size and structural shape to the battery, it should be understood that the invention is not limited to embodiment in such form and may have application in whatever size and shape, and therefore area, of battery cell desired. For example, if desired, the battery of the present invention may be sized to operate small-power devices such as gas sensors, micromachines, digital wristwatches and hearing aids, or large-power devices such as electrically-powered vehicles. Thus, while the present invention is capable of embodiment in many different forms, this detailed description and the accompanying drawings disclose only specific forms as examples of the invention. Those having ordinary skill in the relevant art will be able to adapt the invention to application in other forms not specifically presented herein based upon the present description.

Also, the invention and devices to which it may be attached may be described herein in a normal operating position, and terms such as upper, lower, front, back, horizontal, proximal, distal, etc., may be used with reference to the normal operating position of the referenced device or element. It will be understood, however, that the apparatus of the invention may be manufactured, stored, transported, used, and sold in orientations other than those described.

The terms "overlay" and "overlaying" are used herein to refer to a battery layer that is positioned above, but does not necessarily contact, another battery layer of the thin-film battery. The terms "underlay" and "underlying" are used herein to refer to a battery layer that is positioned below, but does not necessarily contact, another battery layer of the thin-film battery. For purposes of determining whether a particular battery layer is positioned above or below another battery layer, the frame of reference is that of a cross-section through the several battery layers of the battery as is shown in appended FIGS. 3, 5, and 7. The phrase "in series" as used herein refers to a battery layer that is in electrical series with another battery layer of the thin-film battery.

In addition, the terms "anode" and "cathode" are used herein to refer to the electrodes of the present invention. It will be understood that the terms "anode" and "cathode" are used herein to refer to the electrodes of only a limited number of possible embodiments of the present invention. It will further be understood that the invention has applicability to thin-film rechargeable batteries including electrodes identified as other than anodes and cathodes.

The term substrate, as used herein, shall mean one or more layers or structures which may include active or operable portions of a thin-film rechargeable battery device formed over a surface that may be either on or in the substrate. A substrate is often, but not always, the lowest layer of material.

The individual layers that comprise the battery structure of the present invention may be formed, such as, for example, by chemical vapor deposition (CVD), rf or dc magnetron sputtering, or by any other film-deposition process known in the art and commonly used in, for example, the semiconductor industry. Masking may be utilized to build the battery structures as illustrated.

Figure 3:
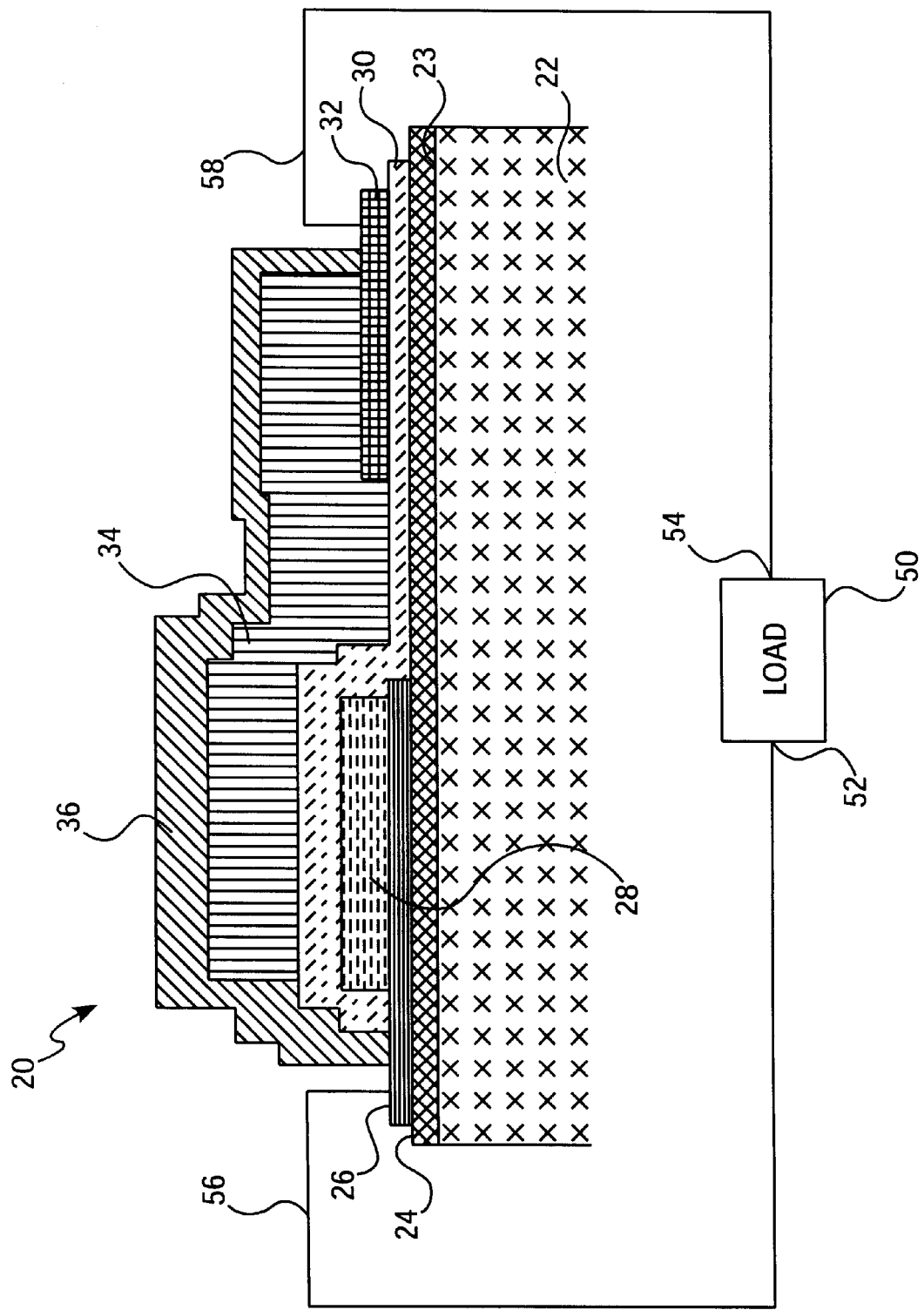
FIG. 3 is a cross-sectional view of one embodiment of the present invention illustrating a thin-film rechargeable battery assembly including a metallic substrate.

Turning now to the drawings, FIG. 3 is a cross-sectional view of one embodiment of a thin-film rechargeable battery structure 20 of the present invention including a metallic substrate 22 having a surface 23 for supporting layered battery components. The layered battery components include, in series: a metal oxide layer 24 overlaying at least a portion of the metallic substrate 22; a first electrode current collector 26 (hereinafter referred to as the cathode current collector) overlaying at least a portion of the metal oxide layer 24; a first electrode layer 28 (hereinafter referred to as a cathode layer) overlaying at least a portion of the cathode current collector 26; an electrolyte film layer overlaying at least a portion of at least one of the cathode current collector 26, the cathode layer 28, and the metal oxide layer 24; a second electrode current collector 32 (hereinafter referred to as the anode current collector) overlaying at least a portion of the electrolyte layer 30; a second electrode film layer 34 (hereinafter referred to as the anode layer) overlaying at least a portion of at least one of the electrolyte layer 30 and the anode current collector 32; and a protective layer 36 overlaying at least a portion of at least one of the cathode current collector 26, the electrolyte layer 30, the anode layer 34 and the anode current collector 32.

The metallic substrate 22 is, generally, the lowest layer upon which the other layers of the battery structure 20 are formed. The metallic substrate 22 may be a thin metal foil of about 25 $\mu$m thick. For high-power applications, the metal that forms the substrate 22 may be selected based on one or more of the following criteria: 1) the melting point of the metal should be significantly higher than the maximum annealing temperature that generally forms the metal oxide layer 24, as will be described; 2) the inter-diffusion and the reaction rates with the cathode layer 28 should be minimal at the maximum annealing temperature; 3) the metal oxide 24 should be a stable electrical insulator; 4) the rate of thermal oxidation (or the growth rate of the metal oxide layer 24) should be moderate at the annealing temperature and environment to maintain the metallic core; 5) the metal oxide layer 24 should be adherent, dense and fairly wear-resistant; and 6) the thermal expansion coefficient of the metallic substrate 22 should be greater than that of the cathode layer 28 so that the desired orientation in the cathode layer 28 occurs to enhance the ionic intercalation and deintercalation process. Various metals or metal alloys combining two or more metals satisfying one or more of the above process parameters may be used to form the metallic substrate 22, such as, for example, zirconium (Zr) or titanium (Ti) whose melting temperatures are 1852° C. and 1668° C., respectively. The diffusion rates for zirconium and titanium, therefore, are expected to be small at temperatures around 700° C. As illustrated in the below examples, pertinent data and physical properties of the metal used to form substrate 22, such as diffusion rates, were determined experimentally. It is also believed that lighter metals having lower density, such as, for example, aluminum may also be used for the metallic substrate 22.

The metal oxide layer 24 serves as an electrically insulating, thermal layer. Formation of the metal oxide layer 24 may be achieved by any means known in the art, but is typically the result of annealing the cathode layer 28 to achieve cathode crystallinity. Typically, annealing occurs at about 550° C. to 900° C. for about ten minutes to six hours in either air or oxygen. For example, the metal oxide layer 24 may be formed by annealing at about 700° C. for about two hours in oxygen to a thickness of about 15 $\mu$m. For high-power applications, annealing the deposited cathode layer is necessary because, at ambient temperature, the cathode layer is typically amorphous and lacks the crystallinity and the conductance necessary for high-current requirements. Where zirconium is used to form the metallic substrate 22, the product of oxidation reaction is $ZrO_2$ which acts as an electrical insulator. Where titanium is used to form the metallic substrate 22, the product of oxidation reaction is $TiO_2$, which, in the low temperature rutile form, acts as an excellent dielectric material. The oxidation rates of titanium and zirconium (in the exposed regions) have been found to be suitable for the manufacturing process and purposes in thin-film batteries. In the temperature range of particular interest, for example, between 600 to 800° C., the rate of oxidation of zirconium is linear in air. See, e.g., John C. Haygarth and Lloyd J. Fenwick, *Thin Solid Films*, Vol. 118, p. 351(1984), which is incorporated herein by reference. The rate of oxidation of titanium follows the cubic and Evan's law. See, e.g., *V. I. D'yachkov, Zhurnal Prikladnoi Khimii*, Vol. 59, No. 3, p. 481(1986), which is incorporated herein by reference. The appropriateness of the oxidation growth rates of zirconium and titanium was determined experimentally, as shown in the results listed below.

The cathode current collector 26 may be a non-oxidizing, refractory material such as, for example, platinum, gold, or any other material suitable material for high-power applications, and having an adhesion layer of cobalt, nickel, or manganese. For low-power applications, the cathode current collector 26 may be any conductive material known in the art. The cathode current collector 26 may be formed by any means known in the art, such as, for example, by dc magnetron sputtering cobalt and platinum sequentially in argon to a thickness of about 0.03 $\mu$m and 0.3 $\mu$m, respectively. When annealing is employed, the metal oxide layer 24 may be formed between the metallic substrate 22 and the cathode current collector 26, as illustrated. Accordingly, in its final form, the cathode current collector 26 of the battery structure 20 may not directly contact some or all of the metallic substrate 22.

The cathode layer 28 may be formed from any suitable material known in the art such as, for example, $LiCoO_2$, $LiNiO_2$, or $LiMn_2O_4$. The material that forms the cathode current collector 26 should be compatible with the material that forms the cathode layer 28. For example, where $LiCoO_2$ is used as the material for the cathode layer 28, cobalt should be used as the material for the cathode current collector 26. For proper placement of the cathode layer 28, an appropriate mask portion may be placed over the underlying layers. For example, $LiCoO_2$ may be deposited to a thickness of about 3 $\mu$m by rf magnetron sputtering of bulk $LiCoO_2$ target in argon and oxygen.

The electrolyte layer 30 may be any electrolyte know to those skilled in the art, such as an amorphous lithium phosphorus oxynitride ("Lipon electrolyte") having a thickness of about 1.2 $\mu$m. The Lipon electrolyte generally has the chemical formula $Li_xPO_yN_z$ (wherein x is about 3.3, y is about 3.8, and z is between about 0.16 and 0.46). The electrolyte layer 30 may be formed, for example, by rf magnetron sputtering lithium orthophosphate ($Li_3PO_4$) in nitrogen ($N_2$) at low pressure. In a similar manner to that discussed above, the appropriate portions of the underlying layers may be masked to prevent these portions from being coated with the electrolyte layer 30.

The anode current collector 32 may be any anode material known in the art, such as, for example, nickel (Ni) or a Ni/Cr (chromium) alloy (having about 80 wt % or more Ni). The anode current collector 32 may be formed by any means known in the art such as, for example, by dc magnetron sputtering nickel to a thickness of about 0.3 $\mu$m.

The anode layer 34 may be formed of any anode material known in the art, such as, for example, lithium or silicon-tin oxynitride (Siton). For example, the anode layer 34 may be formed over the underlying layers by masking the appropriate areas and depositing lithium or siton via thermal evaporation or rf sputtering in nitrogen to a thickness of about 3 $\mu$m.

The protective layer 36 may be formed of any moisture sealing material such as, for example, a polymeric material, to seal and protect the contacting layers from damage due to exposure to air and moisture. For example, the protective layer 36 may be a parylene/Ti multilayer and formed by masking the appropriate underlying areas and sputtering the multilayer in place to a thickness of about 3 $\mu$m.

FIGS. 4A–4F illustrate one method of fabricating the thin-film rechargeable battery 20 of the present invention. The cathode current collector 26 may be formed over the metallic substrate 22 (FIG. 4A). The cathode layer 28 may be formed over the cathode current collector 26 (FIG. 4B) and annealed to achieve cathode conductivity and crystallinity. By annealing, the electrically insulating, thermal oxide layer 24 (FIG. 4C) is formed over the metallic substrate 22, and may separate all or a portion of the cathode current collector 26 from the metallic substrate 22. The electrolyte layer 30 may be formed over the cathode current collector 26, the cathode 28, and the metal oxide layer 24 (FIG. 4D). The anode current collector 32 may be formed over the electrolyte layer 30 (FIG. 4E). The anode layer 34 may be formed over the electrolyte layer 30 and the anode current collector 32 (FIG. 4F). The protective layer 36 may be formed over the underlying layered components, as illustrated, to produce the thin-film rechargeable battery 20 (FIG. 4G). The metal oxide layer 24 together with the electrolyte layer 30 provide an electrical barrier that isolates the cathode current collector 26 and the anode current collector 32. Masking may occur, as described above and as known in the art, so that each of the layers may be formed as shown.

The thin-film rechargeable battery 20 and related method are applicable for both low-power and high-power battery applications. However, because this arrangement includes the formation of the cathode current collector 26 and the annealing application, which, as illustrated on the second embodiment, have been found to be unnecessary in low-power applications, this embodiment provides particular advantages for high-power applications.

Figure 5:
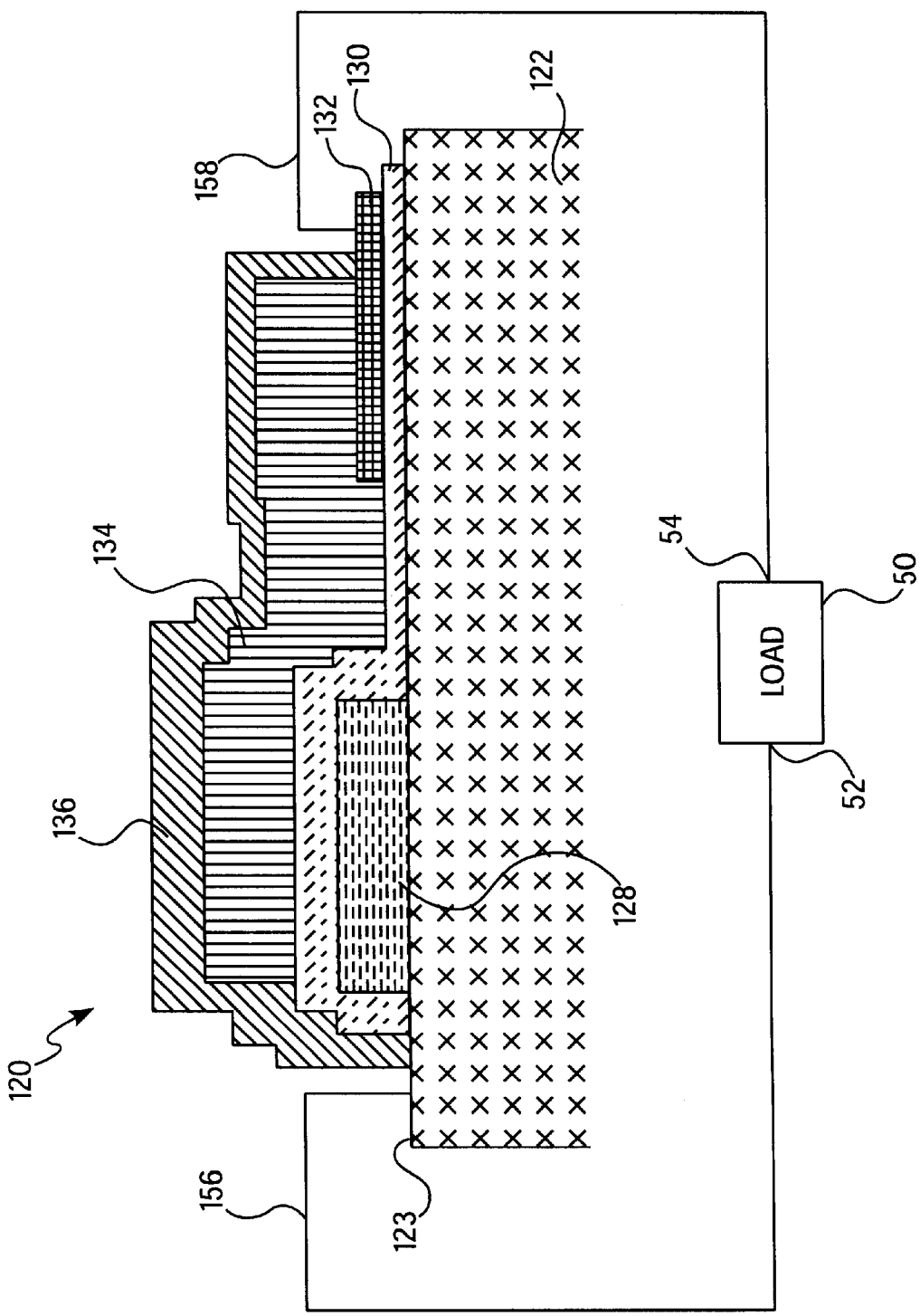
FIG. 5 is a cross-sectional view of another embodiment of the present invention illustrating a thin-film rechargeable battery assembly including a metallic substrate.

FIG. 5 is a cross-sectional view illustrating the second embodiment 120 of the thin-film rechargeable battery of the present invention. For reasons to be discussed, this embodiment is particularly applicable for low-power battery applications. Unless specifically provided for, the materials that form the individual layers and the method of forming the battery 120 are the same as described in the previous embodiment. Thin-film rechargeable battery structure 120 includes a metallic substrate 122 having a surface 123 for supporting the layered battery components. The layered components include, in series, a first electrode layer 128 (hereinafter referred to as a cathode layer), an electrolyte film layer 130, a second electrode current collector 132 (hereinafter referred to as the anode current collector), a second electrode film layer 134 (hereinafter referred to as the anode layer), and a protective layer 136.

FIGS. 6A–6E illustrate one method of forming the second embodiment 120 of the present invention. The cathode layer 128 may be formed over at least a portion of the metallic substrate 122 (FIG. 6A). The electrolyte layer 130 may be formed over at least a portion of at least one of the metallic substrate 122 and the cathode layer 128 (FIG. 6B). The anode current collector 132 may be formed over at least a portion of the electrolyte layer 130 (FIG. 6C). As illustrated in FIG. 6D, the anode layer 134 may be formed over at least a portion of the electrolyte layer 130 and the anode current collector 132. The protective layer 136 may be formed over the underlying layered components, to produce the thin-film rechargeable battery 120, as illustrated in FIG. 6E. As described previously, asking may occur prior to the formation of each layer for proper orientation and shaping of the layered components.

In embodiment 120, a separate cathode current collector need not be formed over he metallic substrate 122 because, in low-power applications, the metallic substrate 122 will function as a cathode current collector. Therefore, the second embodiment assembly can begin directly with the formation of the cathode layer 128. Because this embodiment does not require the high power of a crystalline cathode, annealing can be eliminated. Accordingly, the metal oxide layer, formed in the first embodiment, need not be formed in this embodiment. Moreover, because the absence of the annealing process eliminates the most stringent processing environment, the criteria outlined previously for choosing a suitable metal for the substrate 22 in the first embodiment need not impose limitations on the metal that may be used to form the metallic substrate 122 for this embodiment, and any metal may be used. In this embodiment, the electrolyte layer 130 functions as the electrical barrier necessary to isolate the metallic substrate 122 (acting as the cathode current collector) and the anode current collector 132.

FIG. 7 illustrates a third embodiment of a battery arrangement of the present invention. This embodiment illustrates that a thin-film battery having layered components arranged as described in detail above may overlay typical substrate materials, is such as glass, polymers, and ceramics and thereby provide advantages over the prior art structures. Unless specifically provided for, the materials that form the individual layers and the method of forming the battery of FIG. 7 are the same as described in the previous embodiments. The embodiment of FIG. 7 provides a ceramic substrate 222 having a surface 223 for supporting layered battery components. The layered components include, in series, a first electrode current collector 226 (hereinafter referred to as a cathode current collector), a first electrode layer 228 (hereinafter referred to as a cathode layer), an electrolyte layer 230, a second electrode current collector 232 (hereinafter referred to as the anode current collector), a second electrode layer 234 (hereinafter referred to as an anode layer), and a protective layer 236.

Figure 8A:
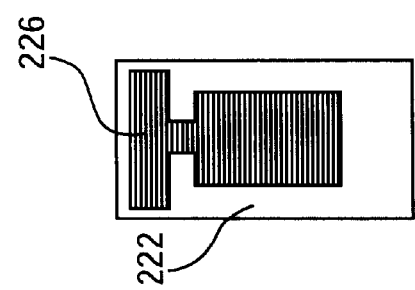
FIGS. 8A–8F are top plan views illustrating one method of forming the thin-film rechargeable battery of FIG. 7.
Figure 8B:
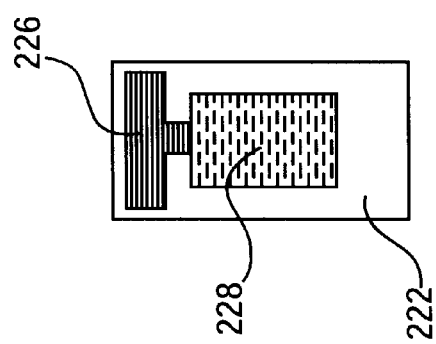
Figure 8C:
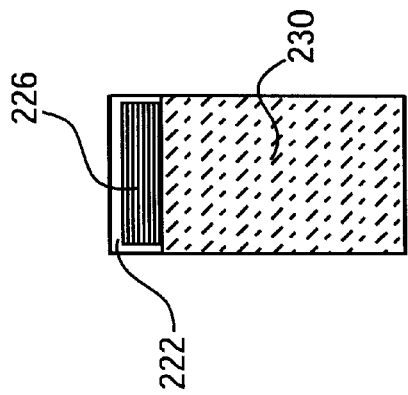
Figure 8D:
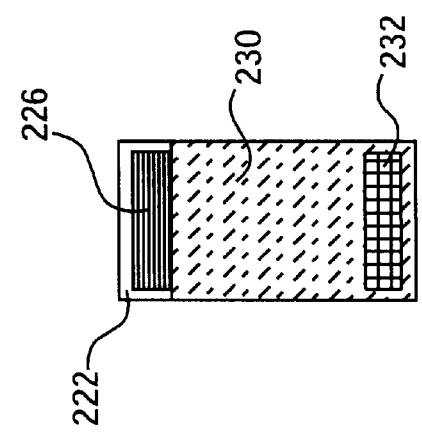
Figure 8E:
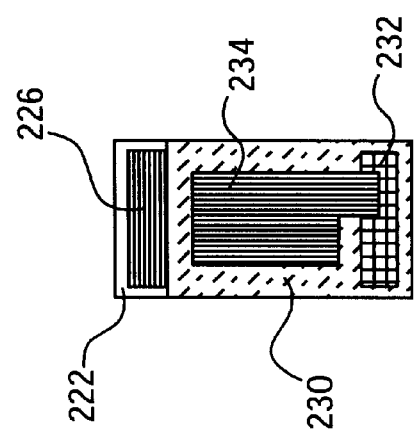
Figure 8F:
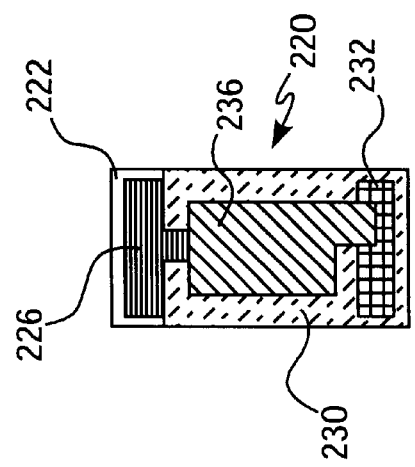

FIGS. 8A–8F illustrate one method of forming the embodiment 220 of the present invention. The cathode current collector 226 may be formed over at least a portion of the substrate 222 (FIG. 8A). The cathode layer 228 may be formed over at least a portion of the cathode current collector 226 (FIG. 8B). The electrolyte layer 230 may be formed over at least a portion of a least one of the cathode current collector 226, the cathode 228, and the substrate 222 (FIG. 8C). The anode current collector 232 may be formed over the electrolyte layer 230 (FIG. 8D). The anode layer 34 may be formed over the electrolyte layer 230 and the anode current collector 232 (FIG. 8E). The protective layer 36 may be formed over the underlying layered components, as illustrated, to produce the thin-film rechargeable battery 220 (FIG. 8F). Masking may occur, as described above and as known in the art, so that each of the layers may be formed as shown.

By forming the anode current collector 232 over the electrolyte layer 230, the electrolyte layer 230 acts as an additional electrical barrier necessary to isolate the anode current collector 232 from the cathode current collector 226. Forming the anode current collector 232 over the electrolyte layer 230 reduces reactivity between the underlying layers and provides additional electrical stability, thereby providing a more effective battery cell. This is true for high-power applications, as illustrated in FIG. 3, and low-power applications as illustrated in FIG. 5. Accordingly, the arrangement of the layered components of the present invention provides advantages over the prior art, regardless of the substrate material used or the power application needed.

Figure 8G:
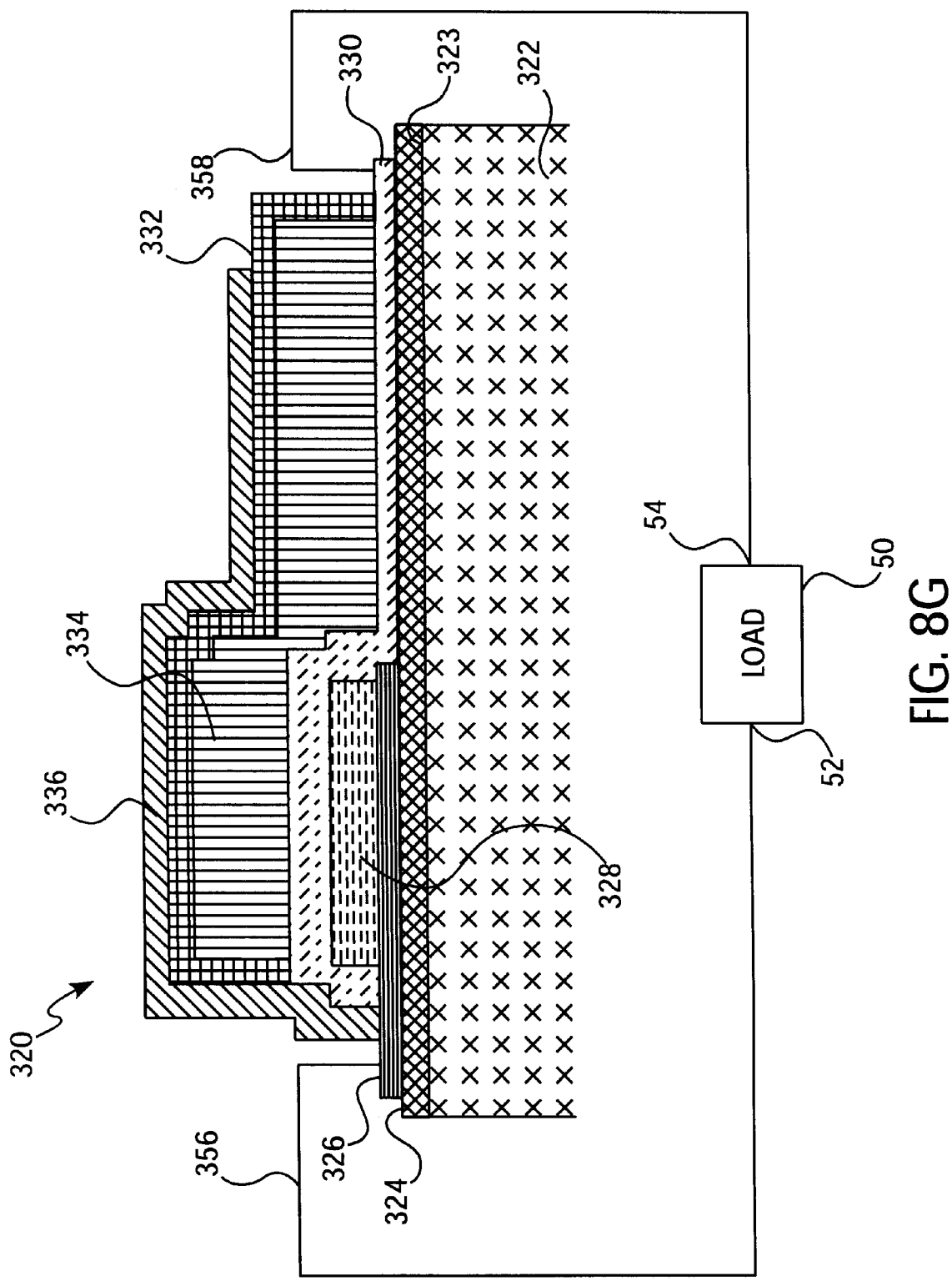
FIG. 8G is a cross-sectional view of another embodiment of the present invention illustrating the layered components over a substrate.

As illustrated in FIG. 8G, it is contemplated that the anode current collector 332 may be interchanged with the anode layer 334 so that the anode current collector 332 overlays the anode layer 334 when the anode layer 334 is not lithium. This arrangement enhances the function of the protective layer 336. This arrangement may also be applied to batteries 20, 120, and 220 illustrated in FIGS. 3, 5, and 7.

As further illustrated in FIGS. 3, 5, 7, and 8G, the thin-film rechargeable batteries 25 20, 120, 220, 320 of the present invention may be employed in an electrical apparatus. The apparatus incorporates an electrical load 50 having a first terminal 52 and a second terminal 54. The first terminal 52 may be connected to a positive terminal 56, 156, 356, 256, leading to the cathode current collector 26, 226, 326 (FIGS. 3, 7, and 8G), respectively, or the metallic substrate 122 (FIG. 5), respectively. The second terminal 54, 154, 254, 354 may be connected to a negative terminal 58, 158, 258, 358, respectively, leading to the anode current collector 32, 132, 232, 332, respectively.

The present invention uses cost-effective and process-appropriate layered components over the substrate material for low-power and high-power thin-film rechargeable batteries. For low-power applications (FIGS. 5 and 6), there is a cost and time benefit realized as a result of eliminating the cathode current collector forming step. In both low-power and high-power battery applications (FIGS. 3–6), the metallic substrate 22, 122 improves manufacturability by increasing substrate strength, and by the inherent potential of reel-to-reel processing of metal foils. Volume reduction and improved specific capacity/energy are achieved by using a thin metal as the substrate material. Also, formation of the anode current collector over the electrolyte for both high-power is and low-power applications in all embodiments (FIGS. 3–8) provides greater stability of the battery cell by reducing chemical reaction between the layers.

The below examples are for illustration only and are not meant to limit the scope of the appended claims.

EXAMPLES

Embodiments of the thin-film rechargeable battery of the present invention were analyzed to determine manufacturability, utility, and effectiveness. Where the cathode layer 28 was formed directly over the metallic substrate, the results from the experiments indicate that the refractory cathode current collector is typically necessary for high-power applications. The experiments and their results have been summarized as follows.

Example 1

Polished tantalum, titanium, and zirconium where used as the metallic substrate material to be the foundation for supporting the subsequent battery layers. The cathode layer was formed to a thickness of about 3000 Å. The cathode layer was then subjected to annealing at 700° C. for about 2 hours in 100% $O_2$ at a heating rate of about 10° C./min. The results of the annealing process where measured using XRD, XPS, and depth profiling.

The substrate, the cathode layer, and the metal oxide layer were analyzed after the annealing step. The analysis showed that the tantalum substrate nearly oxidized completely at the given process parameters. Accordingly, tantalum was eliminated as a choice for the substrate material at these process conditions. However, it is believed that the tantalum substrate may perform effectively as a substrate material with modifications of the process conditions. On the other hand, a relatively thick surface oxide formed over the zirconium and titanium substrates, while maintaining the metallic core, and thereby providing satisfactory annealing results.

Figure 9:
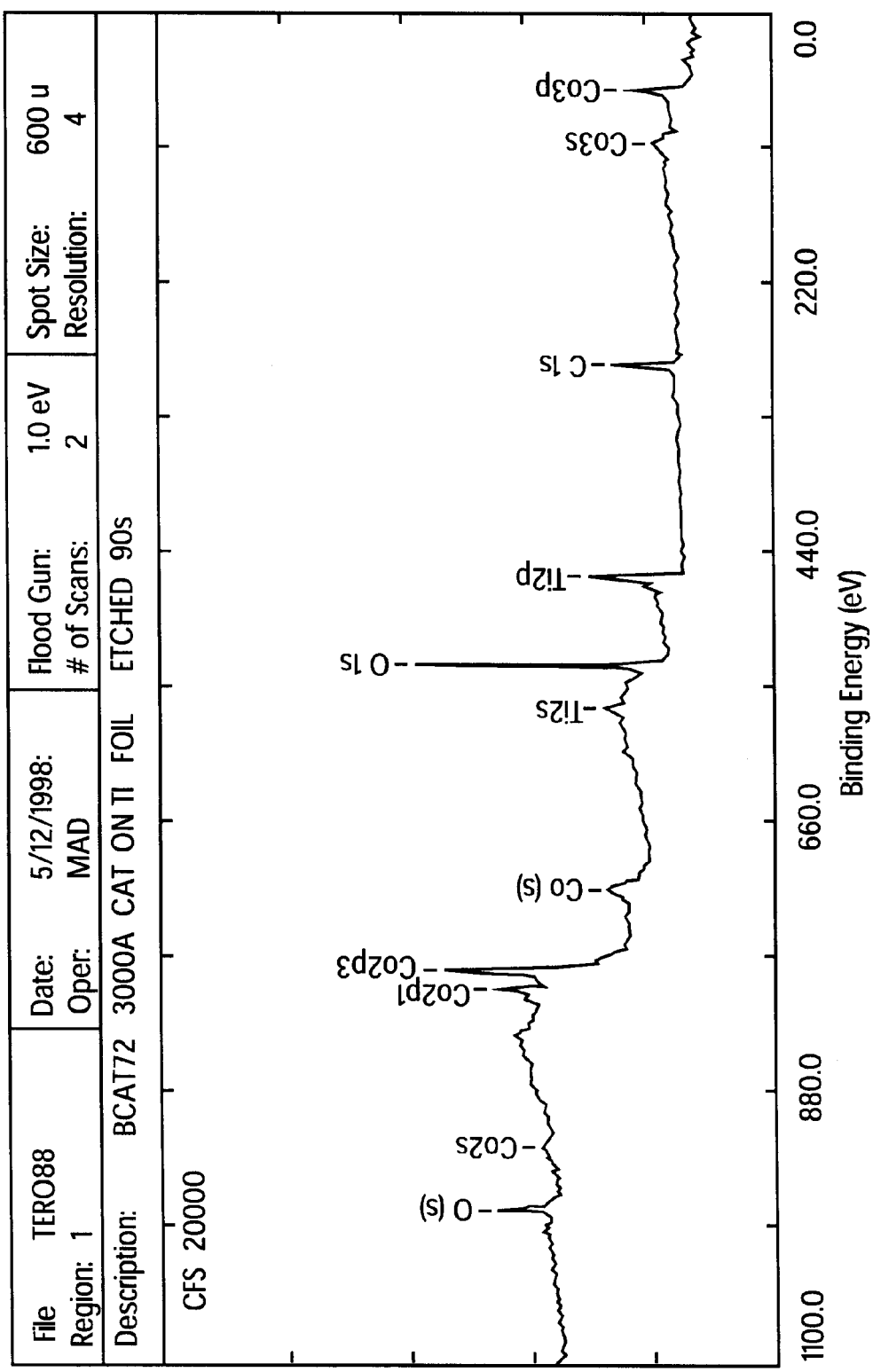
FIG. 9 illustrates an XPS spectrum of a 3000-Å-thick $LiCoO_2$ layer formed over a titanium foil substrate after high temperature annealing.
Figure 10:
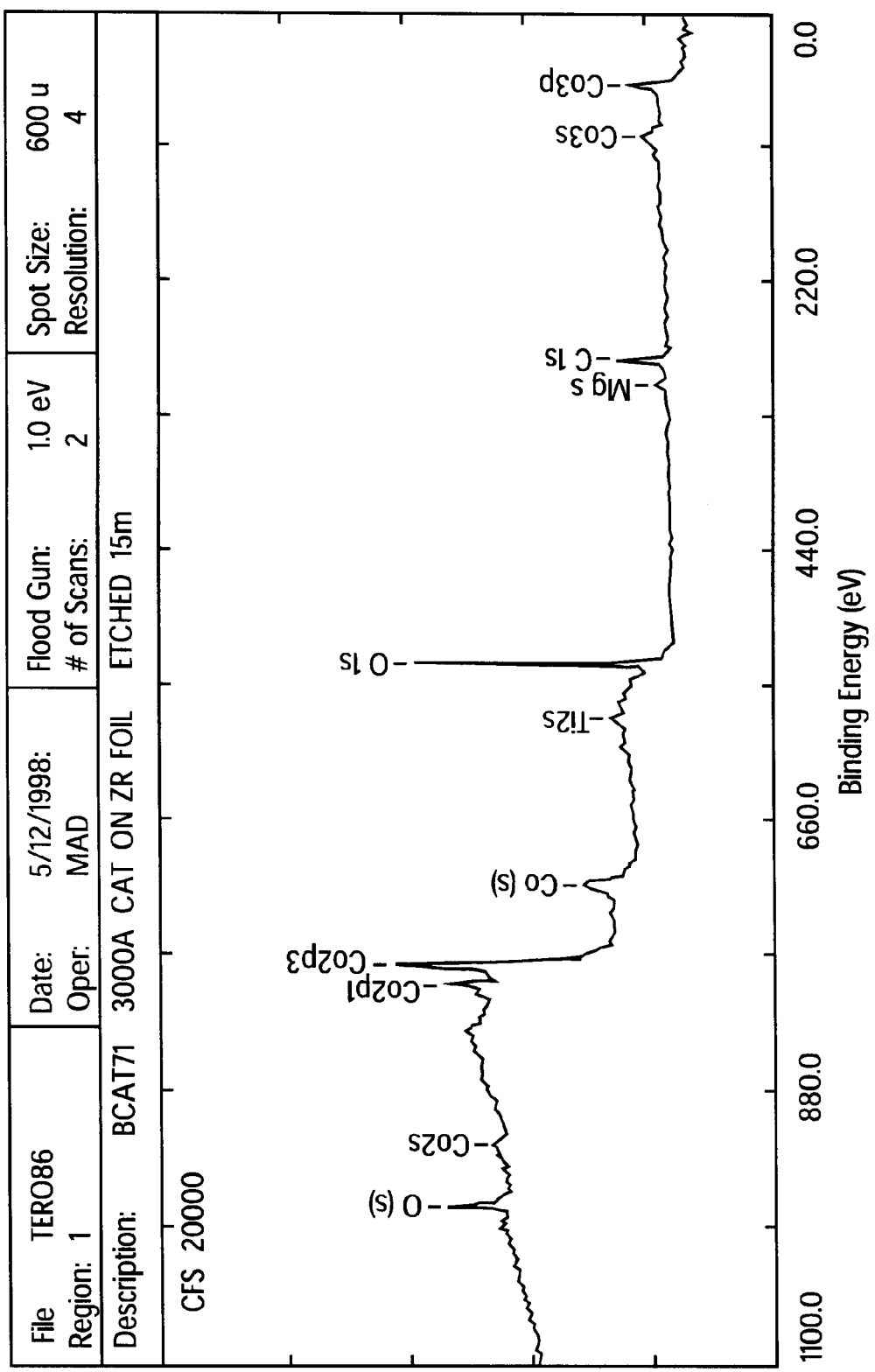
FIG. 10 illustrates an XPS spectrum of a 3000-Å-thick $LiCoO_2$ layer formed over a zirconium foil substrate after high temperature annealing.
Figure 11:
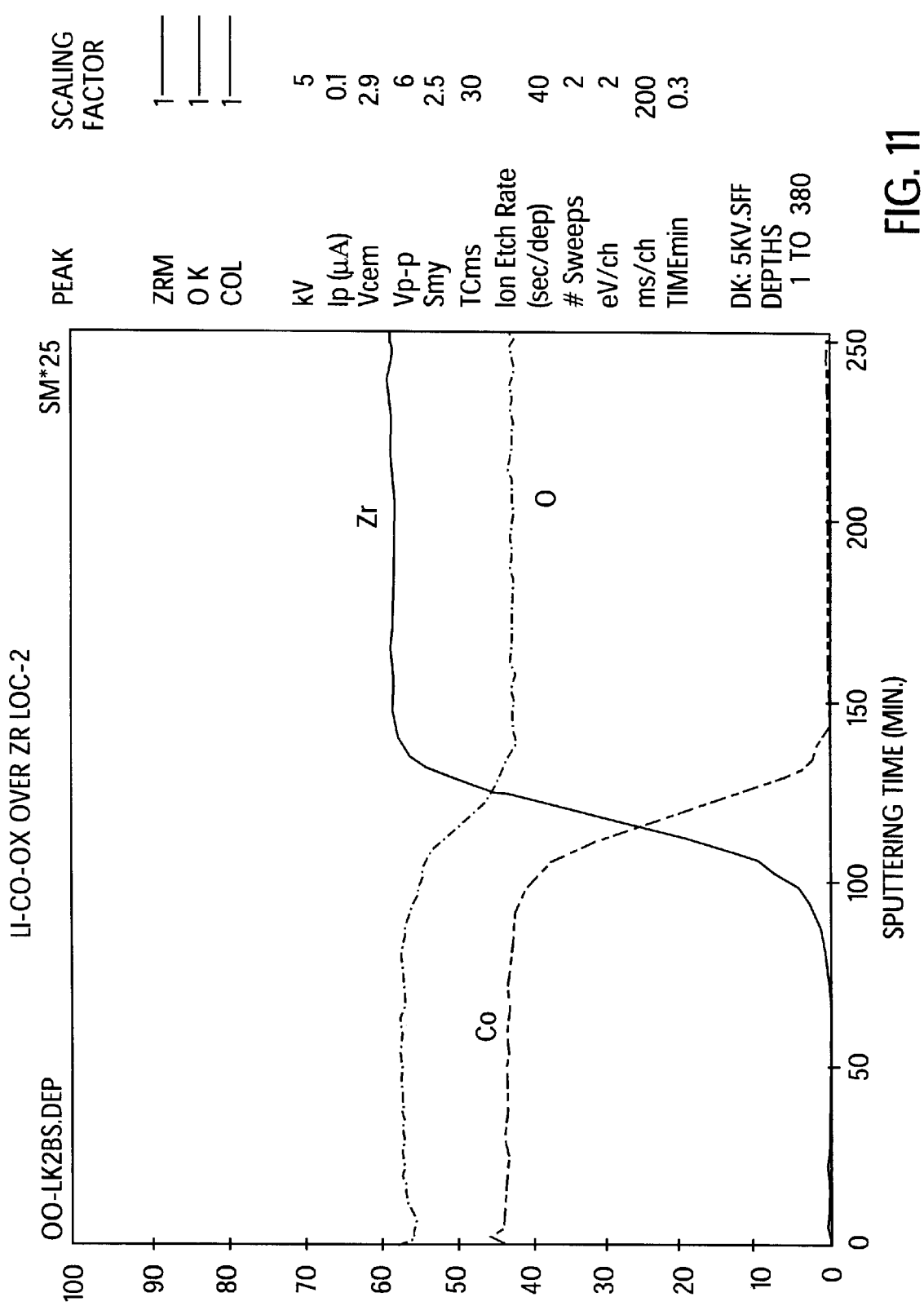
FIG. 11 illustrates a depth profile using auger spectroscopy of a $LiCoO_2$ layer formed over a zirconium substrate after high temperature annealing.

As illustrated in FIGS. 9–11, using XPS and depth profiling of the annealed cathodes, it was determined that the titanium substrate had diffused to the top of the cathode. The zirconium substrate had no signal on the top surface. The depth profiling of zirconium exhibited almost ideal interface, confirming limited or no inter-diffusion at the substrate-cathode interface. However, the substrate below is also in oxide form, ($ZrO_2$), necessitating the cathode current collector layer.

Figure 12:
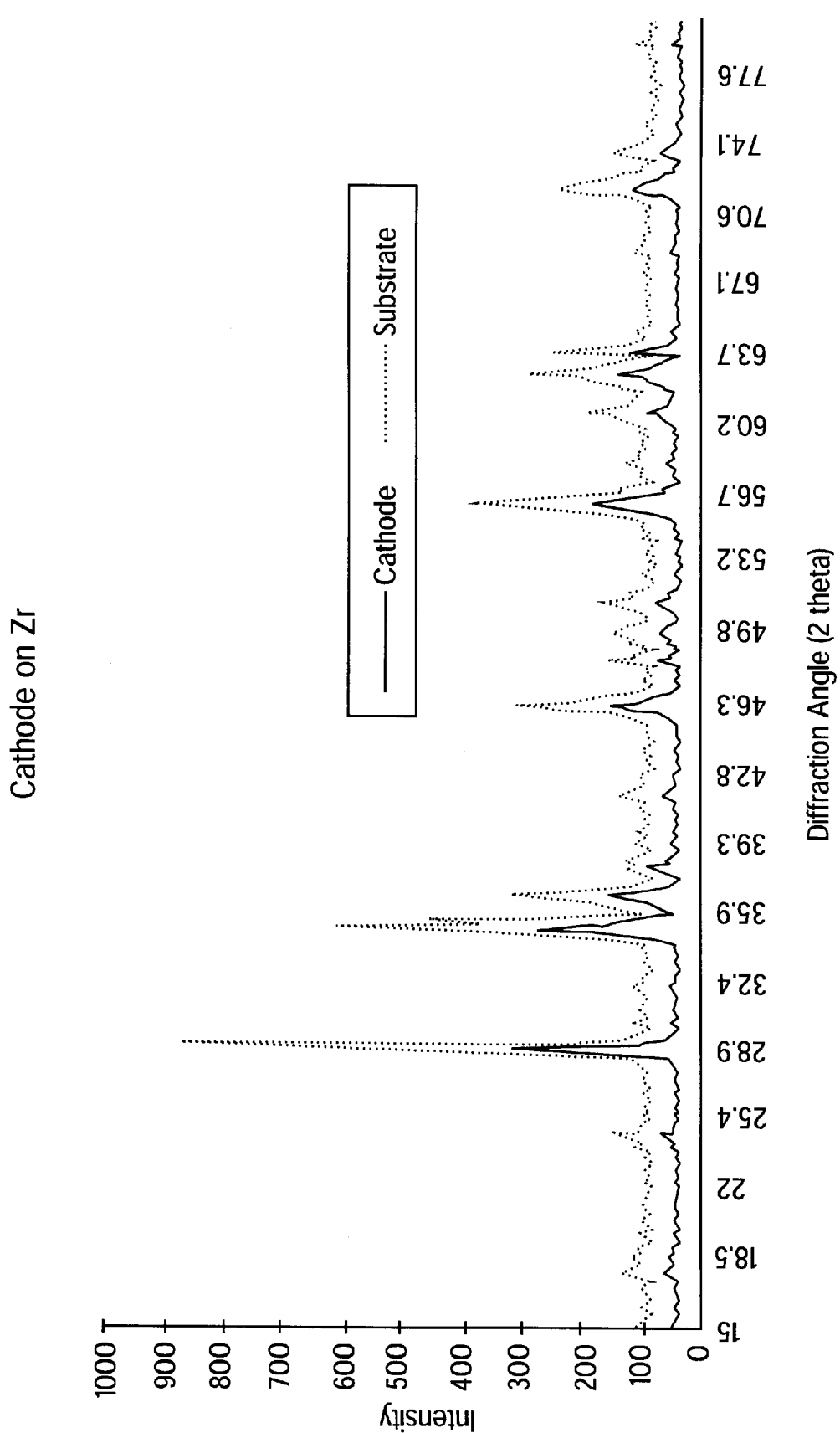
FIG. 12 illustrates an XRD pattern of surface oxide and cathode layers formed on a zirconium foil substrate after high temperature annealing.

As illustrated in FIG. 12 and Table 1, the annealed cathode layers on zirconium substrates where analyzed using XRD on processed metal analysis. As illustrated in FIG. 12 and Table 2, the zirconium metal oxide had formed below the cathode evidencing the need for a non-oxidizing, refractory current collector. The parenthetical information provided in Tables 1 and 2 is the crystallographic plane of the set material.

Example 2

Polished titanium and zirconium where used to form the metallic substrates. A cathode current collector was formed over the metallic substrate to a thickness of 3000 Å. The cathode layer was then subjected to annealing at 700° C. for about 2 hours in 100% $O_2$ at a heating rate of about 10° C./min. The results of the annealing process where measured using XPS analysis.

The appearance of the substrate, the cathode layer, and the metal oxide layer after annealing was as described in Example 1.

Figure 13:
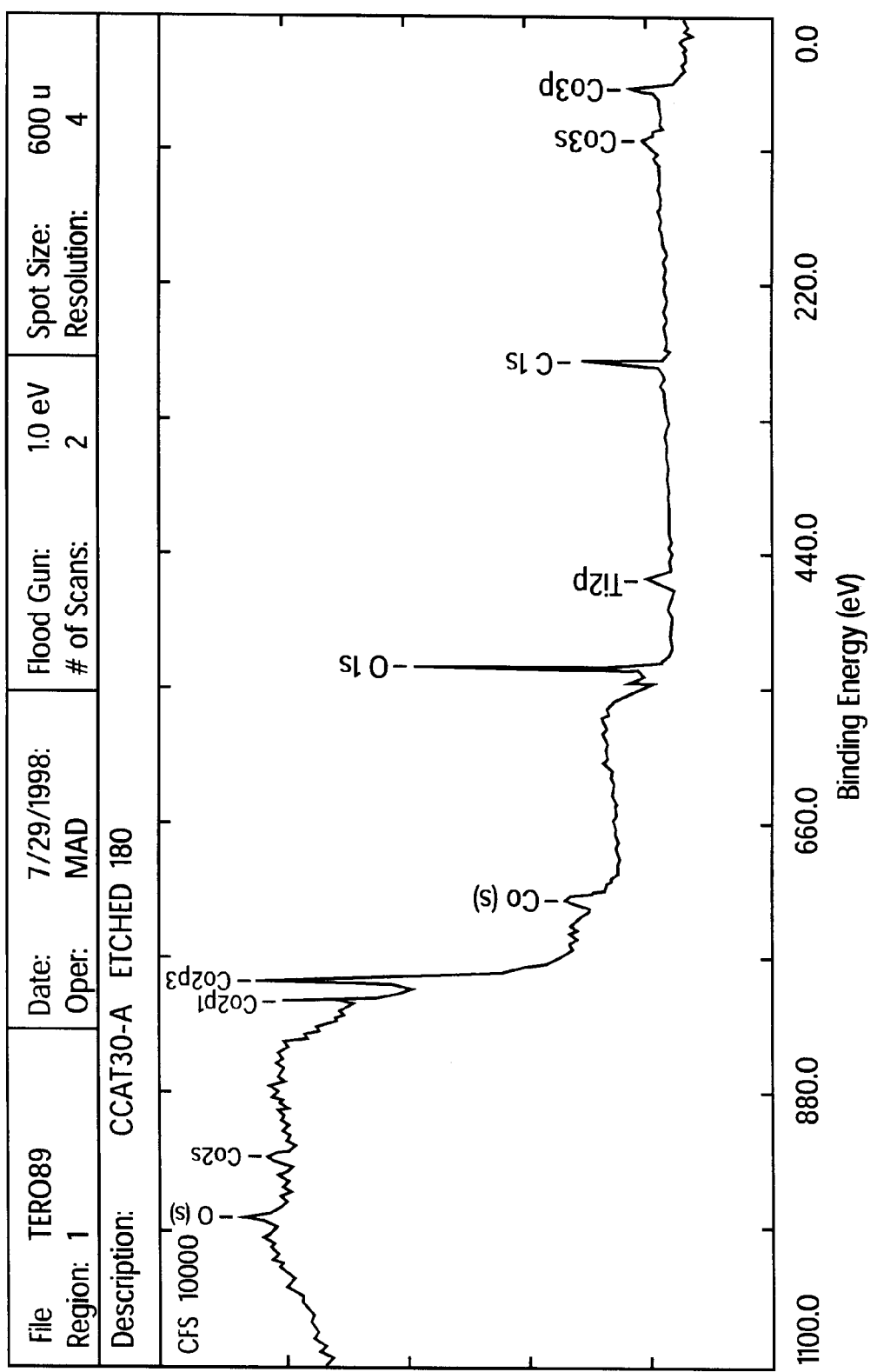
FIG. 13 illustrates an XPS Spectrum on 3000-Å-thick $LiCoO_2$ layer formed on 3000-Å-thick Pt, 300-Å-thick Co on Ti after high temperature annealing.

FIG. 13 is an XPS spectrum illustrating the results of using titanium as a substrate. The results of the XPS analysis of the annealed cathodes showed that some titanium had diffused to the top of the cathode, causing inter-diffusion difficulties. However, the signal was far less than those seen when a cathode current collector was not used (Example 1).

It was determined that the zirconium material need not be analyzed because the formative of the cathode current collector layer in this embodiment would only be a greater improvement over the positive results discussed in Example 1.

TABLE 1

Assignments of the XRD Peaks for Cathode/Zr Over Substrate

| Diffraction Angle | d-spacing | Relative Intensity | Assignment |
| --- | --- | --- | --- |
| 24.35 | 3.652 | 6 | $ZrO_2$(110) |
| 28.52 | 3.127 | 100 | $ZrO_2$(−111) |
| 30.59 | 2.92 | 2 | |
| 31.73 | 2.818 | 4 | $ZrO_2$(111),Zr(100) |
| 34.49 | 2.598 | 51 | $ZrO_2$(200),Zr(002) |
| 36.16 | 2.482 | 24 | Zr(101) |
| 41.15 | 2.192 | 5 | |
| 45.73 | 1.983 | 23 | |
| 48.00 | 1.894 | 11 | Zr(102) |
| 49.45 | 1.842 | 7 | $ZrO_2$(220),Zr(110) |

TABLE 1-continued

Assignments of the XRD Peaks for Cathode/Zr Over Substrate

| Diffraction Angle | d-spacing | Relative Intensity | Assignment |
|---|---|---|---|
| 50.94 | 1.791 | 7 | |
| 55.77 | 1.647 | 28 | $ZrO_2(220),Zr(110)$ |
| 60.46 | 1.53 | 8 | |
| 62.25 | 1.49 | 15 | $Zr(103)$ |

TABLE 2

Assignments of the XRD Peaks for Cathode/Zr Over Film

| Diffraction Angle | d-spacing | Relative Intensity | Assignment |
|---|---|---|---|
| 17.63 | 5.025 | 5 | $LiCoO_2(003)$ |
| 24.35 | 3.653 | 7 | $ZrO_2(110)$ |
| 28.56 | 3.123 | 100 | $ZrO_2(-111)$ |
| 34.5 | 2.597 | 68 | $ZrO_2(200),Zr(002)$ |
| 36.21 | 2.479 | 30 | $Zr(101)$ |
| 37.78 | 2.379 | 18 | $LiCoO_2(101)$ |
| 39.35 | 2.288 | 4 | |
| 41.15 | 2.192 | 7 | |
| 45.74 | 1.982 | 34 | |
| 48.05 | 1.892 | 7 | $Zr(102)$ |
| 49.42 | 1.843 | 8 | |
| 50.93 | 1.791 | 9 | |
| 55.8 | 1.646 | 40 | $ZrO_2(220),Zr(110)$ |
| 60.41 | 1.531 | 13 | |

Table 3 illustrates measured specific energies of the present invention using various substrate materials for high-power and low-power applications. The $LiCoO_2$ layers in rows 1 and 2 illustrate high-power applications, and the $LiMn_2O_4$ in rows 3 and 4 illustrate low-power applications. Column 1 illustrates the specific energies of the layered components of the present invention over a ceramic substrate having a thickness of 5 mil. Columns 2 and 3 illustrate the specific energies of the layered components of the present invention over zirconium substrates of 2 mil and 1 mil thicknesses, respectively. In this regard, it is believed that annealing methods may be developed that do not affect the metal substrate, thereby allowing the use of lighter metals having lower density, such as, for example, aluminum and titanium, to increase the specific energies disclosed below. Column 4 illustrates the specific energies of the layered components of the present invention over a typical density (1.5 gm/cm$^3$) of polymeric substrate having a thickness of 1 mil.

TABLE 3

ENERGY DENSITIES

| Specific Energies | 5 mil | 2 mil | 1 mil | 1 mil |
|---|---|---|---|---|
| $LiCoO_2$(Wh/l) | 90.350979 | 187.92251 | 293.61617 | N/A |
| $LiCoO_2$(Wh/kg) | 23.651378 | 34.211086 | 62.797394 | N/A |
| $LiMn_2O_4$(Wh/l) | 71.252783 | 150.09948 | 237.82242 | 237.82242 |
| $LiMn_2O_4$(Wh/kg) | 18.81127 | 27.45959 | 48.949763 | 123.04343 |

Although the foregoing description has necessarily presented a limited number of embodiments of the invention, those of ordinary skill in the relevant art will appreciate that various changes in the configurations, details, materials, and arrangement of the elements that have been herein described and illustrated in order to explain the nature of the invention may be made by those skilled in the art, and all such modifications will remain within the principle and scope of the invention as expressed herein in the appended claims. In addition, although the foregoing detailed description has been directed to embodiments of the thin film rechargeable battery of the invention in the form of thin film rechargeable lithium batteries, it will be understood that the present invention has broader applicability and may be used in connection with the construction of other battery structures for use in additional applications. All such additional applications of the invention remain within the principle and scope of the invention as embodied in the appended claims.

What is claimed is:

1. A thin-film rechargeable battery comprising a metallic substrate and including, in series, a first electrode layer and an electrolyte layer, each said layer overlaying said substrate.

2. The battery of claim 1, further comprising, in series, an electrode current collector and a second electrode layer overlaying said electrolyte layer, and wherein said first electrode layer is a cathode layer, said electrode current collector is an anode current collector, and said second electrode layer is an anode layer.

3. The battery of claim 1, further comprising, in series, a second electrode layer and an electrode current collector overlaying said electrolyte layer, and wherein said first electrode layer is a cathode layer, said electrode current collector is an anode current collector, and said second electrode layer is an anode layer.

4. The battery of claim 2 further comprising a cathode current collector underlying at least a portion of said cathode layer and in contact therewith.

5. The battery of claim 4 wherein said substrate is zirconium.

6. The battery of claim 4 further comprising a metal oxide layer underlying at least a portion of said cathode current collector and in contact therewith.

7. The battery of claim 1 wherein said electrolyte is an amorphous lithium phosphorous nitride.

8. A thin-film rechargeable battery comprising a metallic substrate supporting a plurality of layered battery components.

9. The battery of claim 8 wherein said layered battery components include, in series, a first electrode, an electrolyte, an electrode current collector, and a second electrode.

10. The battery of claim 9 wherein said first electrode is a cathode, said second electrode is an anode, and said electrode current collector is an anode current collector.

11. The battery of claim 9 wherein said electrolyte is an amorphous lithium phosphorus nitride.

12. The battery of claim 8 wherein said metallic substrate is zirconium.

13. The battery of claim 8 wherein said metallic substrate forms an electrically insulating, adherent thermal oxide upon annealing.

14. The battery of claim 8 wherein said layered battery components include, in series, a metal oxide, a first electrode current collector, a first electrode, an electrolyte, a second electrode current collector, and a second electrode.

15. The battery of claim 14 wherein said metallic substrate is zirconium.

16. The battery of claim 14 wherein said first electrode current collector is a cathode current collector, said first electrode is a cathode, said second electrode current collector is an anode current collector, and said second electrode is an anode.

17. The battery of claim 14 wherein said electrolyte is an amorphous phosphorous nitride.

18. A thin-film rechargeable battery, comprising:

a metallic substrate;

a metal oxide layer overlaying at least a portion of said metallic substrate;

a first electrode current collector overlaying at least a portion of said metal oxide layer;

a first electrode overlaying at least a portion of said first electrode current collector;

an electrolyte overlaying at least a portion of at least one of said metal oxide and said first electrode;

a second electrode current collector overlaying at least a portion of said electrolyte; and a second electrode overlaying at least a portion of at least one of said electrolyte and said electrode current collector.

19. The battery of claim 18 wherein said metallic substrate forms an electrically insulating, adherent thermal oxide upon annealing.

20. The battery of claim 19 wherein said metallic substrate is zirconium.

21. The battery of claim 18 wherein said first electrode is a cathode, said second electrode is an anode, said first electrode current collector is a cathode current collector, and said second current collector is an anode current collector.

22. The battery of claim 18 wherein said electrolyte is an amorphous lithium phosphorous nitride.

23. A thin-film rechargeable battery, comprising:

a metallic substrate;

a first electrode overlaying at least a portion of said metallic substrate;

an electrolyte overlaying at least a portion of at least one of said metallic substrate and said first electrode;

an electrode current collector overlaying at least a portion of said electrolyte; and a second electrode overlaying at least a portion of at least one of said electrolyte and said electrode current collector.

24. The battery of claim 23 wherein said first electrode is a cathode, said second electrode is an anode, and said electrode current collector is an anode current collector.

25. The battery of claim 23 wherein said electrolyte overlays both said first electrode and said metal substrate.

26. The battery of claim 23 wherein said electrolyte is an amorphous lithium phosphorous nitride.

27. A thin-film rechargeable battery, comprising:

a metallic substrate;

a cathode current collector overlaying said substrate;

a cathode layer overlaying at least a portion of said cathode current collector;

an electrolyte layer overlaying at least a portion of at least one of said cathode and said substrate;

an anode current collector overlaying at least a portion of said electrolyte; and an anode layer overlaying at least a portion of at least one of said electrolyte and said anode current collector.

28. The battery of claim 27 wherein said electrolyte is an amorphous lithium phosphorus nitride.

29. A thin-film rechargeable battery comprising a metallic substrate and including, in series, a first electrode layer and an electrolyte layer, each said layer overlaying a metal oxide layer and said substrate.

30. The battery of claim 29, further comprising, in series, an electrode current collector and a second electrode layer overlaying said electrolyte layer, and wherein said first electrode layer is a cathode layer, said electrode current collector is an anode current collector, and said second electrode layer is an anode layer.

31. The battery of claim 29, further comprising, in series, a second electrode layer and an electrode current collector overlaying said electrolyte layer, and wherein said first electrode layer is a cathode layer, said electrode current collector is an anode current collector, and said second electrode layer is an anode layer.

32. The battery of claim 30, further comprising a cathode current collector underlying at least a portion of said cathode layer and in contact therewith.

33. The battery of claim 29, wherein said substrate is formed of a metal selected from the group consisting of titanium and zirconium.

34. A thin-film rechargeable battery comprising a metallic substrate supporting a plurality of layered battery components overlaying a metal oxide layer and said substrate.

35. The battery of claim 34 wherein said layered battery components include, in series, a first electrode current collector, a first electrode, an electrolyte, a second electrode current collector, and a second electrode.

36. The battery of claim 35 wherein said first electrode current collector is a cathode current collector, said first electrode is a cathode, said second electrode current collector is an anode current collector, and said second electrode is an anode.

37. The battery of claim 35 wherein said electrolyte is an amorphous lithium phosphorus nitride.

38. The battery of claim 34 wherein said metallic substrate is formed of a metal selected from the group consisting of zirconium and titanium.

39. The battery of claim 34 wherein said metal oxide layer is formed upon annealing.

* * * * *

UNITED STATES PATENT AND TRADEMARK OFFICE
CERTIFICATE OF CORRECTION

PATENT NO. : 6,280,875 B1  Page 1 of 1
DATED : August 28, 2001
INVENTOR(S) : Kwak et al.

It is certified that error appears in the above-identified patent and that said Letters Patent is hereby corrected as shown below:

Column 3,
Line 36, delete "." and substitute therefor -- ; --;

Column 6,
Line 43, delete "know" and substitute therefor -- know --;
Line 63, delete "(Siton)" and substitute therefor -- (SITON) --;

Column 8,
Line 2, delete "asking" and substitute therefor -- masking --;
Line 29, delete "is";

Column 9,
Line 15, delete "25";
Line 58, delete "where" and substitute therefor -- were --;

Column 10,
Lines 20, 30 and 35, delete "where" and substitute therefor -- were --.

Signed and Sealed this

Second Day of April, 2002

Attest:

JAMES E. ROGAN
Attesting Officer   Director of the United States Patent and Trademark Office